United States Patent
Emmons, Jr. et al.

(10) Patent No.: US 6,272,314 B1
(45) Date of Patent: Aug. 7, 2001

(54) SUBSCRIBER UNIT FOR BEAM ACQUISITION IN A SATELLITE COMMUNICATION SYSTEM AND METHOD THEREFOR

(75) Inventors: Thomas Peter Emmons, Jr., Mesa; Shawn Hogberg, Chandler, both of AZ (US); Gerald Joseph Davieau, Eldersburg, MD (US); Jim Startup, Tempe; Susan Chen, Chandler, both of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/302,331

(22) Filed: Apr. 30, 1999

(51) Int. Cl.[7] .................................................. H04Q 7/20
(52) U.S. Cl. ........................... 455/12.1; 455/450; 455/62
(58) Field of Search .................................. 455/12.1, 13.1, 455/13.2, 427, 428, 429, 430, 450, 436, 437, 452, 464, 509, 512, 513, 525, 67.6, 60, 62, 516; 342/357.01–357.07

(56) References Cited

U.S. PATENT DOCUMENTS

| | | | |
|---|---|---|---|
| 5,412,389 | 5/1995 | Olds | 342/357 |
| 5,483,664 | * 1/1996 | Mortz et al. | |
| 5,488,640 | * 1/1996 | Redden et al. | 375/357 |
| 5,561,838 | 10/1996 | Chandos et al. | 455/13.1 |
| 5,566,354 | * 10/1996 | Sehloemer | 455/427 |
| 5,644,572 | 7/1997 | Olds et al. | 370/324 |
| 5,790,939 | * 8/1998 | Malcolm et al. | 455/13.2 |
| 5,974,032 | * 10/1999 | Snowden et al. | 370/316 |
| 6,073,020 | * 6/2000 | Andresen | 455/436 |
| 6,108,538 | * 8/2000 | Blasiak et al. | 455/428 |
| 6,128,468 | * 10/2000 | Wyrwas | 455/12.1 |

* cited by examiner

*Primary Examiner*—Dwayne Bost
*Assistant Examiner*—Jean A Gelin
(74) *Attorney, Agent, or Firm*—Frank J. Bogacz

(57) ABSTRACT

In a communications system, an earth-based subscriber unit (40, FIG. 1) receives at least one communications beam (50, 60, FIG. 1) transmitted from one or more moving satellite communications nodes (10, 20). The earthbased subscriber unit evaluates which communications beam should be selected based on the power received (FIG. 2, 210), Doppler frequency shift (270), link quality, (290), interference level (300), and satellite and network specific parameters (310). By considering these factors, the earth-based subscriber unit selects the communications beam (50, 60) that will provide the optimum service and reduce the likelihood that an inter-satellite hand over of the call will be required while the call is in progress.

6 Claims, 2 Drawing Sheets

SUBSCRIBER UNIT FOR BEAM ACQUISITION IN A SATELLITE COMMUNICATION SYSTEM AND METHOD THEREFOR

FIELD OF THE INVENTION

The invention relates to the field of satellite communications and, more particularly, to a subscriber unit for use in a satellite communications system.

BACKGROUND OF THE INVENTION

In a satellite communications system, in which multiple moving satellite communications nodes are visible to an earth-based subscriber unit, the decision as to which satellite communications node will provide services to the subscriber unit is typically based on the power received at the subscriber unit. In a typical satellite communications system, the earth-based subscriber unit measures a power received from one or more communications beam transmitted by each moving satellite communications node which is in view of the subscriber unit. If a particular communications beam possesses sufficient power to be received by the earth-based subscriber unit, the subscriber unit initiates transmissions with the particular satellite corresponding to the highest power communications beam.

However, the selection of a moving satellite communications node by an earth-based subscriber unit based purely on power received at the subscriber unit may not always be the optimum node with which the subscriber unit should communicate based on other factors. For example, a particular moving satellite communications node may already be operating at its full capacity, servicing other, similarly equipped, earth-based subscriber units. In another example, a particular moving satellite communications node may not possess sufficient primary power reserves in order to accommodate any additional earth-based subscriber units. In either example, the optimum communications node may be an adjacent node that is currently not as heavily utilized, or possess more primary power resources than the node exhibiting the highest power communications beams.

In addition to resource limitations, the selection of a particular moving satellite communications node may not be the optimum due to satellite orbit considerations. For example, a satellite possessing the highest power communications beam may be required to hand over a call to a neighboring satellite shortly after the call is initiated. This can place a strain on the satellite communications system as the neighboring satellite is forced to quickly assign channel resources in order to accept the handed over call without degrading the quality of service.

Therefore, it is highly desirable for the communication system subscriber unit to incorporate a method and system for beam acquisition based on factors other than received power from a particular moving satellite communications node. Such a method and system would allow greater sharing of call servicing resources among satellites of the communications system, and, in turn, reduce costs to users of the earth-based subscriber units. Additionally, the method and system would enable the satellite communication system to provide a greater quality of service to earth-based subscribers by reducing call hand overs between the constituent moving satellite communications nodes which comprise the system.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

DESCRIPTION OF THE PREFERRED EMBODIMENTS

A method and system for satellite beam acquisition in a communication system provides an earth-based subscriber unit with a capability to select an optimal communications satellite based on various factors. The use of these factors allows the satellite communications system to provide call connection services to subscribers at the lowest possible cost, and with the least impact to the satellite communications system. The method and system of the invention also provide a capability to provide communications services to earth-based subscribers by minimizing call handovers within the network of moving satellite communications nodes.

Figure 1:
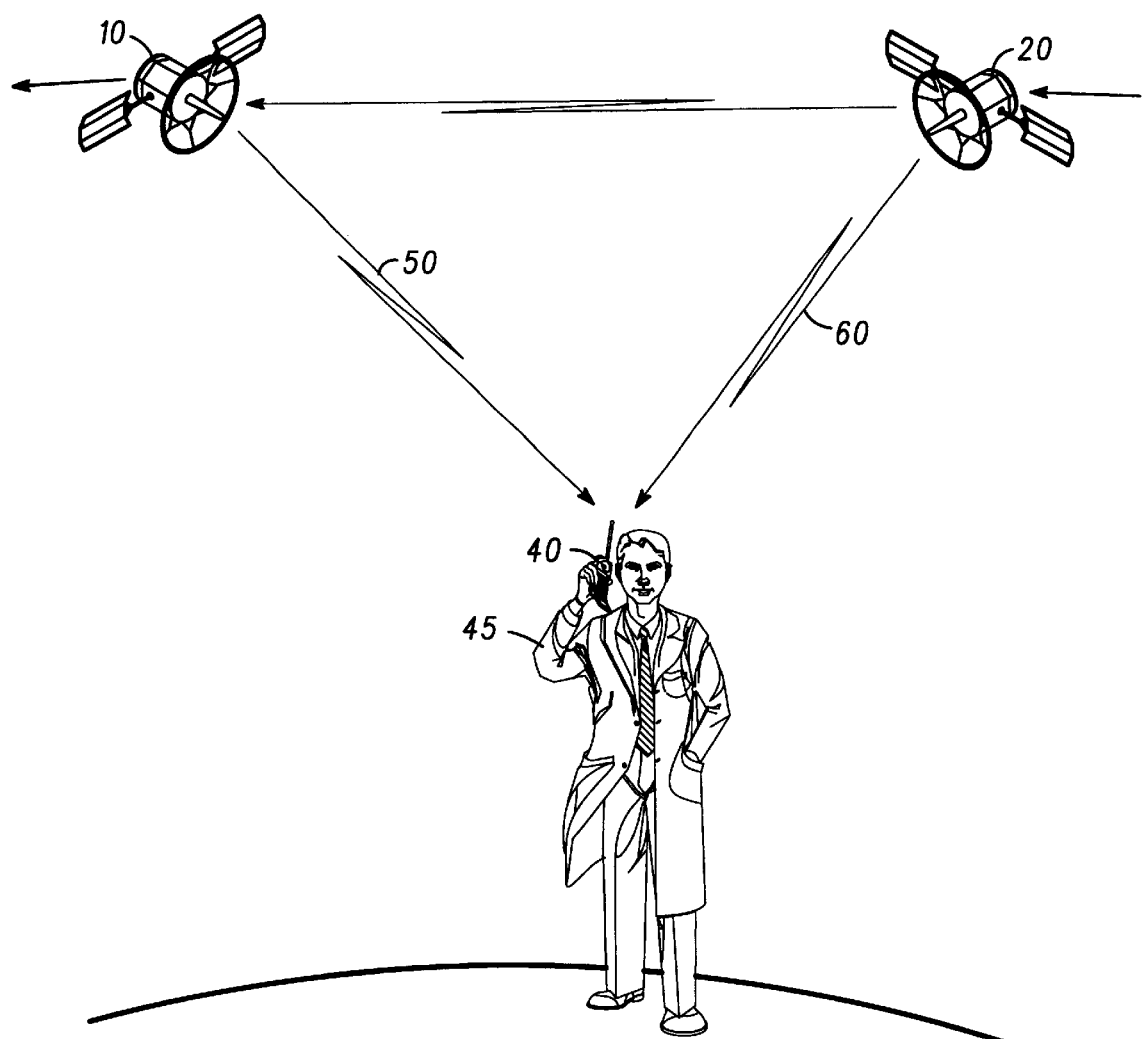
FIG. 1 is a conceptual drawing of an earth-based subscriber unit receiving signals from communications beams transmitted by moving satellite communications nodes in accordance with a preferred embodiment of the invention.

FIG. 1 is a conceptual drawing of an earth-based subscriber unit receiving signals from communications beams transmitted by moving satellite communications nodes in accordance with a preferred embodiment of the invention. In FIG. 1, earth-based subscriber 45 is in possession of subscriber unit 40. Earth-based subscriber unit 40 is capable of receiving communications beams 50 and 60 from moving satellite communications nodes 10 and 20, respectively. In the context of the present invention, earthbased subscriber 45 can be positioned at any point on or near the surface of the earth. Thus, earth-based subscriber 45 may be on land or sea, and can be operating at a fixed location or in any type of moving vehicle.

In a preferred embodiment, moving satellite communications nodes 10 and 20 are satellites placed in a low earth orbit, but can also represent airborne communications nodes which provide functionality similar to that provided communications satellites. Preferably, each of moving satellite communications nodes 10 and 20 provides multiple communications beams other than those represented by communications beams 50 and 60. In FIG. 1, moving satellite communications node 10 is retreating from the area occupied by subscriber 45, while moving satellite communications node 20 is advancing toward earth-based subscriber 45.

Moving satellite communications nodes 10 and 20 are representative of a global or regional communications network which provides an interface with a terrestrial communications infrastructure. In addition to providing this interface, moving satellite communications nodes 10 and 20 may communicate with each other through inter-satellite links or through a network of ground control stations in order to route call traffic between earth-based subscriber unit 40 and other users of the global communications network. Additionally, moving satellite communications nodes 10 and 20 can be used to provide call connectivity between earth-based subscriber unit 40 and conventional wireline and cellular telephone users operating within the terrestrial communications infrastructure. Further, the global or regional communications network represented by moving satellite communications nodes 10 and 20 can also include a network controller which manages the operations of the satellite network including receiving health and status messages from each moving satellite communications node in the network. In a preferred embodiment, moving satellite communications nodes 10 and 20 are capable of performing call handovers to other, similar satellites as each node comes into and out of view of earth-based subscriber unit 40.

As earth-based subscriber unit 40 initiates a call through the satellite communications network represented by moving satellite communications nodes 10 and 20, earth-based subscriber unit 40 determines which of satellites 10 and 20 is the optimum satellite to acquire in order to initiate the call. In a preferred embodiment, earth-based subscriber unit 40 determines the optimum satellite as a result of executing the method of FIG. 2, which is discussed below.

Figure 3:
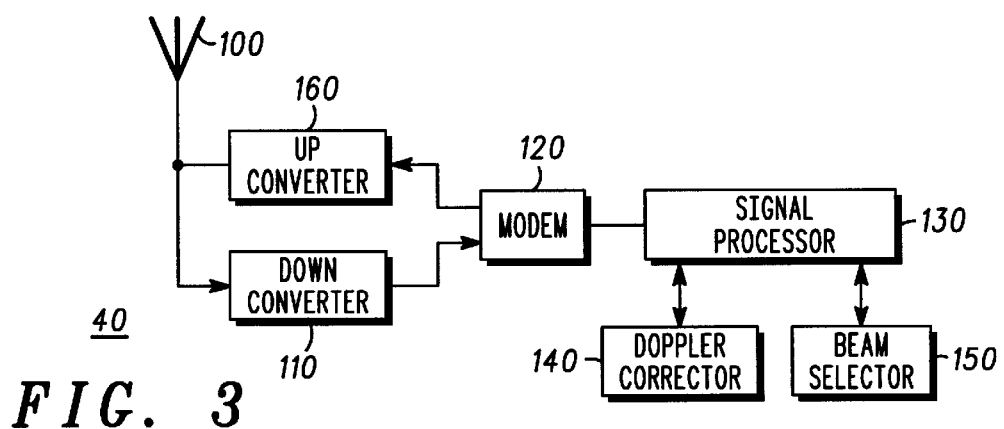
FIG. 3 is a block diagram of an earth-based subscriber unit capable of executing the method of FIG. 2 in accordance with a preferred embodiment of the invention.
Figure 2:
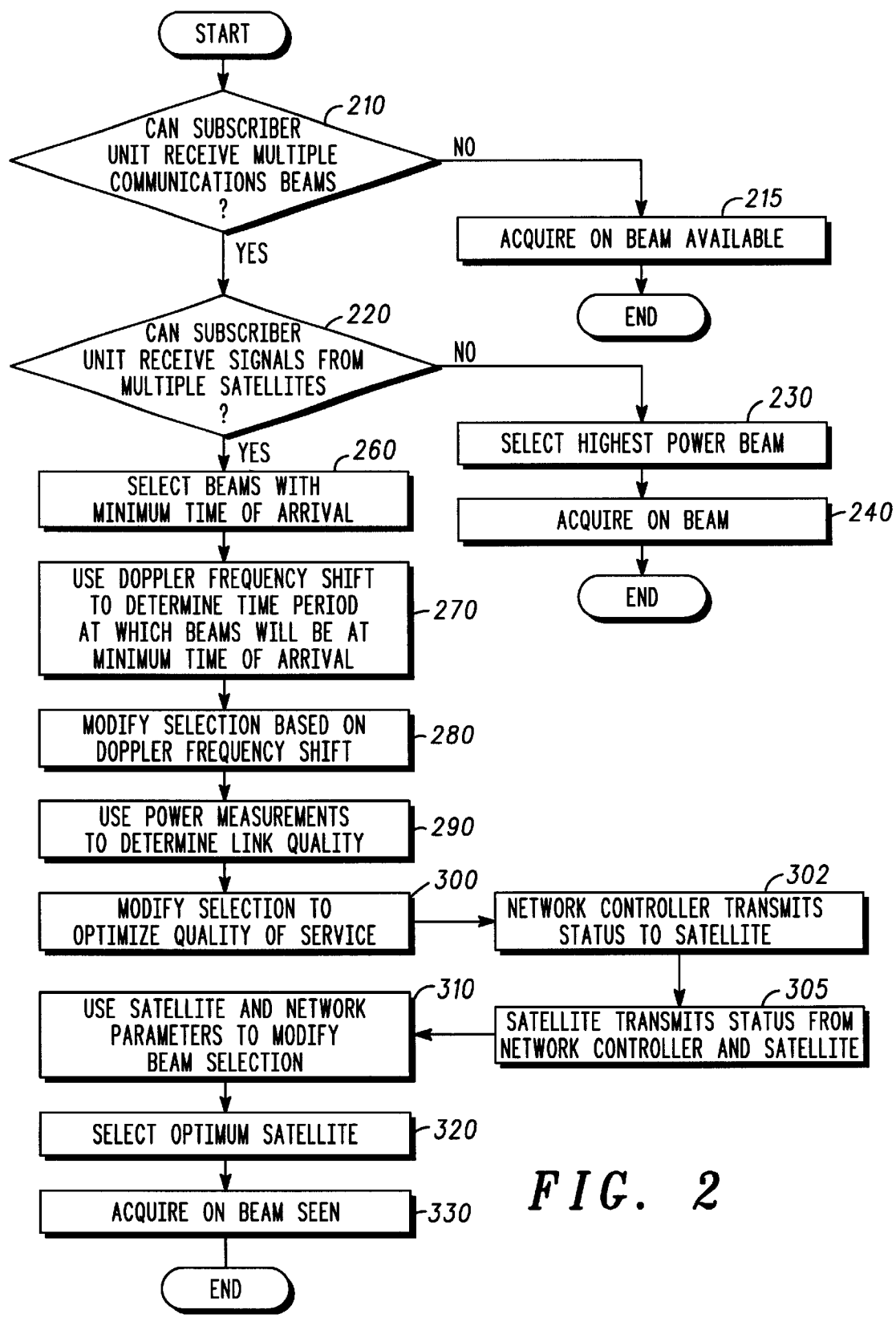
FIG. 2 is a flow chart of a method performed by an earth-based subscriber unit and a communications system to select an optimum communications beam transmitted by a moving satellite communications node in accordance with a preferred embodiment of the invention.

FIG. 2 is a flow chart of a method performed by an earth-based subscriber unit and a communications system to select an optimum communications beam transmitted by a moving satellite communications node in accordance with a preferred embodiment of the invention. The subscriber unit of FIG. 3 is suitable for performing the method of FIG. 2. The method begins at step 210 where an earth-based subscriber unit determines if multiple communications beams can be received. Step 210 may be performed by way of the subscriber unit scanning multiple frequency channels in a frequency division multiple access system, monitoring multiple time slots in a time division multiple access system, or through decorrelating multiple pseudonoise codes in code division multiple access system, or through a combination of one or more of the aforementioned techniques. In a preferred embodiment of the invention, the moving satellite communications nodes are satellites placed in a low earth orbit.

If the decision of step 210 indicates that only one beam possessing sufficient signal strength can be received by the earth-based subscriber unit, step 215 is executed where the subscriber unit initiates communication with the satellite which is transmitting the received communications beam. The method terminates after the execution of step 215.

If, however the decision of step 210 indicates that multiple satellite beams are present, the subscriber unit executes step 220. In step 220, the subscriber unit determines if all received beams are radiated from a single satellite which can be received with adequate signal strength by an earth-based subscriber unit. In a preferred embodiment, step 220 is performed by way of the subscriber unit measuring a propagation delay or time of arrival of each received communications beam. If the decision of step 220 indicates that the received communication beams are emanating from a single satellite, step 230 is executed in which the earth-based subscriber unit selects the communications beam having the highest power signal. The subscriber unit makes use of this beam in order to communicate with the moving communications node in step 240.

If the decision of step 220 indicates that the received beams emanate from multiple moving satellite communications nodes, step 260 is executed where a subset of the received beams are selected for further processing by the earth-based subscriber unit. The method proceeds to step 270 where the earth-based subscriber unit makes use of a Doppler frequency shift in order to determine the time period at which each beam will exhibit a minimal time of arrival. Step 270 provides a correction which adjusts the time of arrival or propagation delay of each received beam through the use of a Doppler correction factor. In step 280, those received communication beams which exhibit an increasing Doppler frequency are weighted positively over those which exhibit a negative Doppler frequency shift. This allows the earth-based subscriber to give preference in the selection of communications beams which are indicative of an approaching satellite (positive Doppler frequency shift) and to discourage the selection of a communications beam which is indicative of a retreating satellite (negative Doppler frequency shift). In a preferred embodiment, the propagation delay of an approaching satellite is reduced, while the propagation delay if a retreating satellite is increased.

Steps 270 and 280 provide a mechanism by which the earth-based subscriber unit can minimize the probability of requiring an inter-satellite hand over which the satellite communications system may be required to perform during a particular call. By selecting a communications beam indicative of an approaching satellite (maximum positive Doppler frequency shift), it can be assured that the satellite will be in view for a longer period of time than a retreating satellite. Thus, the earth-based subscriber unit can remain in contact with the approaching satellite and thus reduce the likelihood that the satellite communications system will be required to perform a hand over to another satellite during the call. In many cases, a short call can be completed without requiring a single inter-satellite hand over.

In step 290, the earth-based subscriber unit evaluates the power received from each communications beam to determine if a link to a particular moving satellite communications node can be maintained. Step 290 may involve using one of several conventional techniques, such as bit error rate estimation, in order to perform a link budget estimation. Step 290 is particularly advantageous during periods when one of the communications beams is momentarily obstructed due to foliage or other obstacles. Thus, step 290 discourages the subscriber unit from selecting a beam which is experiencing blockage which could degrade the communications link between the moving satellite communications node and the subscriber unit. After step 290, the method continues with step 300 where the selection of communications beams is further modified according to quality of service parameters. Step 300 may involve evaluating the interference present in a particular communications beam to determine its suitability for supporting communications traffic according to signal or carrier to noise requirements.

In step 310, the earth-based subscriber unit makes use of satellite parameters in order to further modify the selection of a particular communications beam. In a preferred embodiment, this step is performed in conjunction with step 305, where one or more moving satellite communications nodes transmits a status message to earth-based subscriber units. In a preferred embodiment, each satellite transmits its own status. In an alternate embodiment, a single satellite may broadcast a status message which reflects the condition of its own resources as well as the resources of adjacent satellites. This status message may include prime power availability of a particular satellite, system and resource availability, and other performance-related indicators.

Steps 310 and 305 involve the use of a network controller which provides a capability for the network controller to influence the satellite's decision to accept communications traffic from earth-based subscribers. Thus, for example, in the event that the network controller has knowledge that a particular satellite will soon be required to accept a large number of calls handed over from adjacent satellites, the particular satellite can be commanded not to accept new calls from earth-based subscriber units. Thus, maximum satellite resources can be made available in order to enable the satellite to accept all of the calls which are handed over. Through the use of an input from the network controller, the satellite communications system can better manage the communications resources of the satellite constellation. In a preferred embodiment, the satellite network controller transmits status to the satellite constellation in step 302. In step 305, the satellite transmits status messages from the network controller, as well as information which reflects its own status information to the earth-based subscribers via a broadcast signaling channel The method continues with step 320. In step 320, the earth-based subscriber unit makes a selection of the optimum communications beam based on the outcomes of the preceding steps, such as selecting an optimum communications beam based on a minimum propagation delay and a maximum positive Doppler frequency shift. In step 330, the subscriber unit requests a channel using the selected communications beam and receiving a channel assignment from the corresponding satellite. The method terminates after step 330.

In an alternate embodiment, the method of FIG. 2 can be applied to a terrestrial communications system in which the cellular communications nodes are positioned at fixed locations and the user of the earth-based subscriber unit is in motion relative to one or more of the cellular communications nodes. In this embodiment, steps 210, through 300 are identical to those described in reference to FIG. 2, with the exception that the subscriber unit receives communication beams from fixed cellular communications nodes, as opposed to satellites. In step 302, a network controller provides status and control commands which reflect the conditions of the of the cellular communications system. In step 305, the status of the particular cellular communications node, as well as the status of the network as reported by the network controller, are conveyed to the subscriber unit. Steps 310, 320, and 330 proceed in the same manner as described in reference to FIG. 2, except that the subscriber unit selects a beam transmitted from a cellular communications node, opposed to a satellite. In step 330, the subscriber unit acquires a channel from the from the selected cellular communications node.

FIG. 3 is a block diagram of an earth-based subscriber unit capable of executing the method of FIG. 2 in accordance with a preferred embodiment of the invention. The earth-based subscriber unit of FIG. 2 includes antenna 100 which interfaces to a communications beam to receive and transmit information to and from the subscriber unit. Antenna 100 is coupled to downconverter 110 which provides the necessary down conversion in order to enable further processing by modem 120 at a lower frequency. Modem 120 processes the received signal from the downconverter 110 and sends the processed data to the signal processor 130. The processed data includes all header and message bits necessary to perform acquisition and satellite status.

Signal processor 130 evaluates the characteristics of signals present in each communications beam received through antenna 100. Therefore, signal processor 130 measures time of arrival as well as Doppler frequency shift, interference content, and channel fade content. Signal processor 130 also collects the satellite status information. Signal processor 130 is coupled to Doppler corrector 140 and to beam selector 150. Doppler corrector 140 provides a Doppler correction factor to the time of arrival data of each received signal. In a preferred embodiment, Doppler corrector 140 reduces the numeric value of the time of arrival of a particular communications beam which exhibits a positive Doppler shift and increases the numeric value of the time of arrival of a communications beam which exhibits a negative Doppler shift. This modification increases the likelihood that a communications beam from an approaching satellite will be preferred over a communications beam from a retreating satellite. Signal processor 130 further performs other signal processing functions such as link quality assessment and interference assessment.

Signal processor 130 is also coupled to beam selector 150. Beam selector 150 receives inputs from signal processor 130 which conveys information regarding each of the received communications beams. Additionally, beam selector 150 receives information regarding the satellite status. This information can include the power availability of the satellite, system and resource availability, as well as inputs from the network controller conveyed to the subscriber unit by way of a received communications beam.

In a preferred embodiment, beam selector 150 determines which communications beam to initiate communications based on inputs from signal processor 130. Outputs of beam selector 150 are conveyed to signal processor 130 which sends data to modem 120, for transmission to a particular satellite by way of upconverter 160 and antenna 100.

A method and system for satellite beam acquisition in a communication system provides a earth-based subscriber unit with a capability to select an optimal communications satellite based on factors such as time of arrival, Doppler frequency shift, and satellite performance parameters. The use of the method and system allow the satellite communications system to provide call connection services to subscribers at the lowest possible cost, and with the least impact to the satellite communications system. The method and system also minimizes call handovers within the network of moving satellite communications nodes by allowing the subscriber unit to select approaching satellites over retreating satellites, thus ensuring that the chosen satellite is in view for an extended period of time.

Accordingly, it is intended by the appended claims to cover all modifications of the invention that fall within the true spirit and scope of the invention.

What is claimed is:

1. In a subscriber unit, a method for selecting an optimum communications beam from a plurality of communications beams transmitted from a plurality of communications nodes, comprising the steps of:

measuring a propagation delay of said plurality of communications beams;

measuring a Doppler frequency shift of said plurality of communications beams;

comparing said propagation delay and said Doppler frequency shift of said plurality of communications beams; and selecting said optimum communications beam based on said comparing step.

2. The method of claim 1, wherein said selecting step further comprises the step of selecting said optimum communications beam based on a minimum propagation delay and a maximum positive Doppler frequency shift.

3. The method of claim 1, additionally comprising the step of adjusting said propagation delay of said plurality of communications beams based on said Doppler frequency shift.

4. The method of claim 1 additionally comprising the step of receiving status of at least one of said plurality of communications nodes.

5. The method of claim 4, wherein said status conveys resource availability of said at least one of said plurality of communications nodes.

6. The method of claim 1, additionally comprising the step of receiving channel assignment from said optimum communications beam.

* * * * *